Oct. 27, 1970
ICHIRO ONO
3,537,045
VARIABLE CAPACITOR TYPE TUNER
Filed March 27, 1967
2 Sheets-Sheet 1
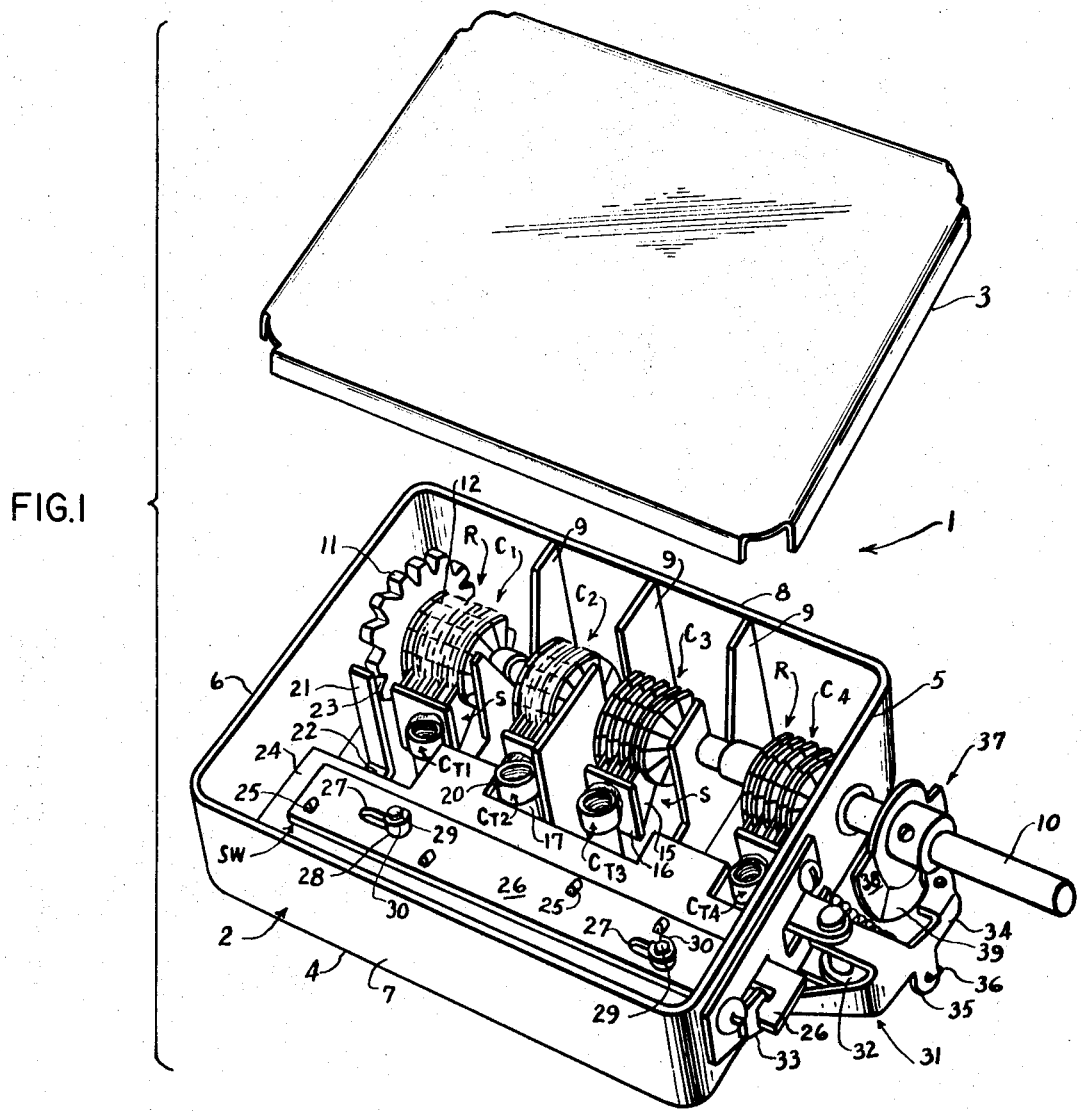
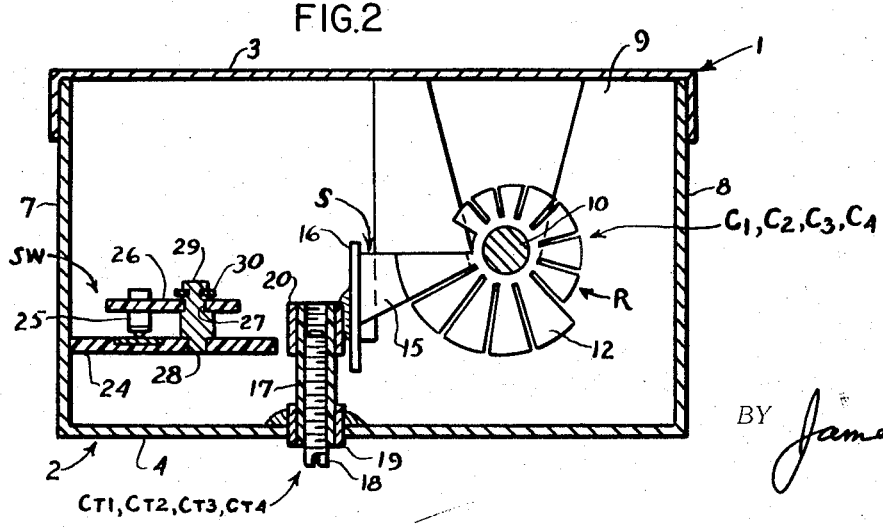
INVENTOR.
ICHIRO ONO
BY *James and Franklin*
ATTORNEYS

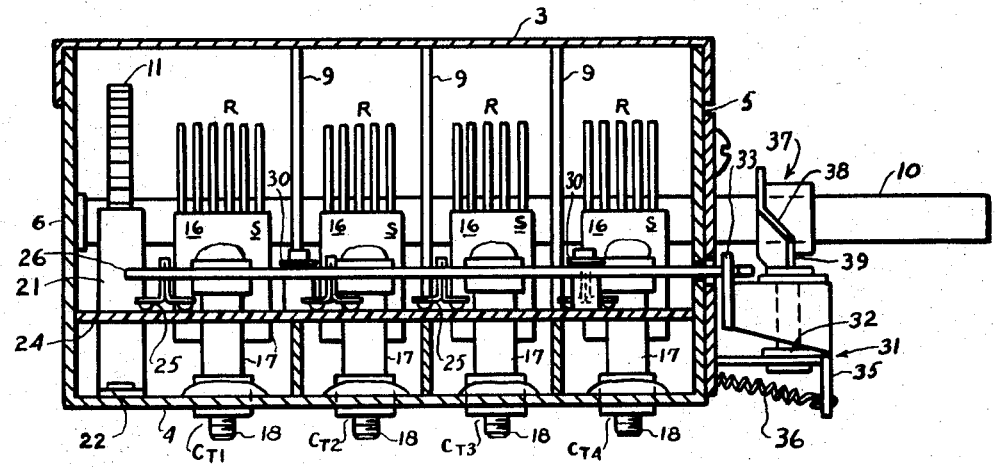
FIG.3
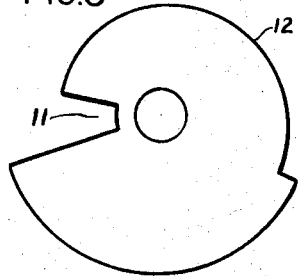
FIG.5
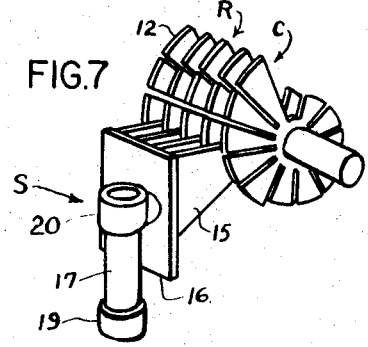
FIG.4
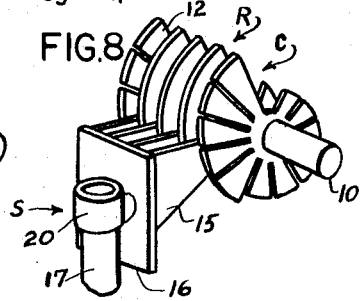
FIG.6
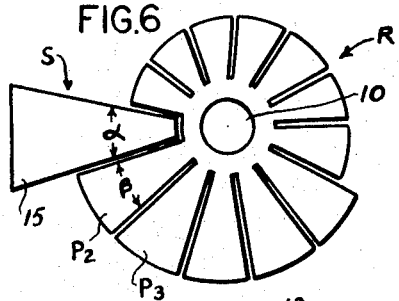
FIG.7
FIG.8
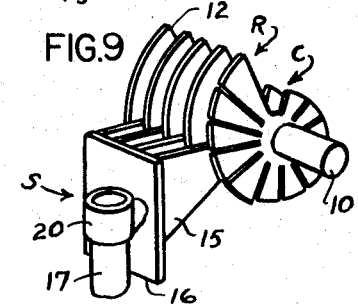
FIG.9
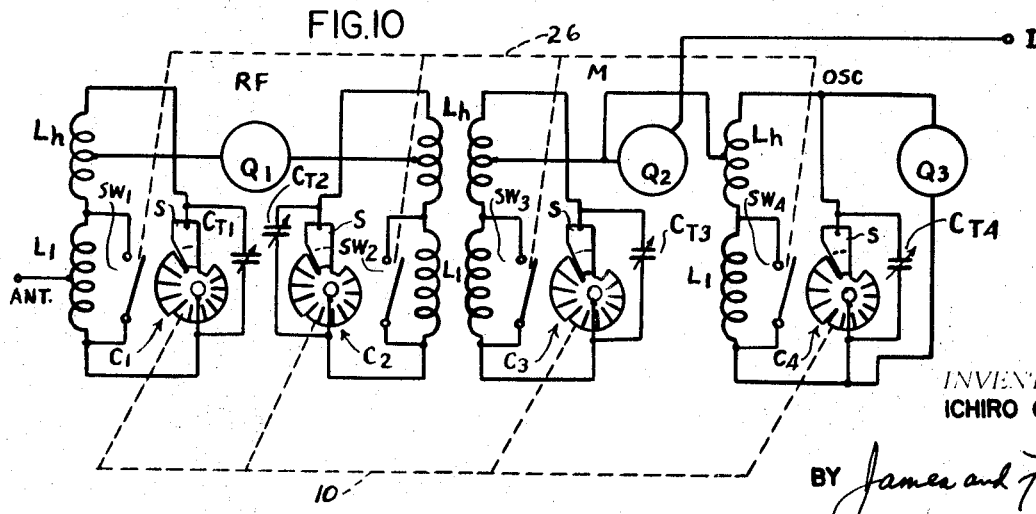
FIG.10

United States Patent Office 3,537,045
Patented Oct. 27, 1970

3,537,045
VARIABLE CAPACITOR TYPE TUNER
Ichiro Ono, Tokyo, Japan, assignor to Alps Electric Company, Limited, Tokyo, Japan, a corporation of Japan
Filed Mar. 27, 1967, Ser. No. 626,110
Claims priority, application Japan, Apr. 5, 1966, 41/30,490
Int. Cl. H03j 5/06, 5/26; H01g 5/08
U.S. Cl. 334—53                                                                 7 Claims

ABSTRACT OF THE DISCLOSURE

A ganged variable capacitor has rotatable plates divided into sectors of equal angle, corresponding to television channels, and interleaved with stator plates which are wedge shaped and conform to one sector of the rotor. One or more of the rotor plates of each group is radially slotted to define the sectors. The shaft has a toothed detent wheel cooperating with a resilient detent to index a desired sector to the stator for channel selection. A trimmer capacitor is associated with each stator. The fixed inductors each have two sections, one of which is shorted for the higher frequency channels, and a ganged shorting switch for this purpose is operated by rotation of the capacitor shaft.

BACKGROUND OF THE INVENTION

Most television tuners are of the switch type or turret type. Such tuners are expensive to manufacture, and are plagued with troubles caused by the many switch contacts required. Variable capacitors with ganged rotors are known, but provide continuous tuning rather than indexed or step-by-step tuning. Moreover, a very wide capacitance range would be needed to cover the frequency spectrum of the twelve VHF channels used in the U.S.A.

SUMMARY OF THE INVENTION

The present improvement employs a ganged variable capacitor, the rotatable plates of which are divided into sectors of equal angle, each corresponding to a television channel, and adapted to be interleaved with generally wedge-shaped sector plates which conform to one sector of the rotor. The shaft of the capacitor is detented so that a desired sector of the rotor may be indexed to the stator for channel selection. Radial slotting of one or more rotor plates helps define the channels.

A different value of inductance is used for the lower frequency group of channels, than for the higher frequency group of channels, and for this purpose the inductors have two parts, one of which is short circuited for the higher frequency channels. This is done by means of a ganged switch operated at the appropriate points by rotation of the capacitor shaft.

The present improvement reduces the size of the tuner, and by its simplicity cuts the cost of manufacture. It affords easy adjustment and maintenance, and has a long life without servicing.

The foregoing and additional features are described in the following detailed specification, which is accompanied by drawings in which:

FIG. 1 is a perspective view of a tuner embodying the invention and showing internal construction seen when the cover is taken off;

FIG. 2 is a transverse vertical section through the tuner;

FIG. 3 is a longitudinal vertical section through the tuner;

FIG. 4 shows a slotted rotor plate;

FIG. 5 shows a rotor plate of similar configuration, but without radial slots;

FIG. 6 shows the relation between the stator plate and the slotted rotor plate;

FIG. 7 is a perspective view showing a rotor construction in which all rotor plates are slit;

FIG. 8 is a similar perspective view showing another rotor construction in which both end plates are slit;

FIG. 9 is a similar perspective view showing a modification in which only one end plate is slit; and FIG. 10 is an electrical diagram showing a particular embodiment of the invention.

Referring to FIG. 1 of the drawings, in this particular embodiment the tuner is housed in a metallic box-type frame 1 which comprises a drawn metal body 2 and a metal cover 3. The body 2 comprises a bottom plate 4, front and back end plates 5 and 6, and two side plates 7 and 8.

A plurality of shielding plates 9 are transversely connected to both side plates 7 and 8 and divide the inside space of the body 2 into a plurality of compartments. In this case four compartments are illustrated, with four variable capacitors.

A rotatable metallic shaft 10 is supported longitudinally between the front end plate 5 and the back end plate 6 in suitable bearings. The rotors R of a plurality of variable capacitors, and a detent wheel or cam 11 which affords indexed or step-by-step rotation, are fixed on shaft 10. Four capacitors $C_1$, $C_2$, $C_3$ and $C_4$ are here shown for illustration.

Each rotor R comprises a plurality of rotor plates 12 for which two different shapes are usually used.

One shape is shown in FIG. 4, and bears a general resemblance to a spiral disc. If the total number of VHF channels is $n$, the disc is divided into $(n+1)$ sections of sectors $P_2$, $P_3$, $P_4$ ... $P_{n+1}$ which have equal included angles to its center. These are defined and separated by the $(n+1)$ slits $13_1$, $13_2$, $13_3$ ... $13_{n+1}$ cut radially towards the center from the circumference. One of said sectors $P_1$ is removed to form a cut away section or gap 14, so that the number of usable sectors coincides with the number of VHF channels.

The sector for the lowest frequency channel has the largest radial length, and the radial length of the individual sectors becomes shorter as the corresponding frequency becomes higher.

FIG. 4 shows the shape of a rotor plate suitable for the channels presently being used in the United States of America, and the two sectors adjacent the gap 14 are alloted to channels numbered 2 and 13. In the U.S.A. the channels are generally separated into two groups, a lower frequency group covering channels numbered 2 through 6, and a higher frequency group covering channels numbered 7 through 13. The radius of the sectors decreases as the frequency increases from sector $P_2$ to $P_6$, and similarly from sector $P_7$ to $P_{13}$, with a stepwise change between sector $P_6$ and $P_7$, because at that point I prefer to provide a change in the fixed inductance value.

Another rotor plate is shown in FIG. 5, and is similar in shape to that shown in FIG. 4, but is made without the radial slits.

Three rotor assemblies are shown in FIGS. 7, 8 and 9, and may be used for each compartment. FIG. 7 shows a rotor in which all of rotor plates have the radial slits. FIG. 8 shows a rotor in which both end plates have the radial slots, and the others are without slots as shown in FIG. 5. FIG. 9 shows a rotor in which only one end plate has the radial slits, and the others are without slits.

The two end plates with slits in FIG. 8, and the single end plate with slits in FIG. 9, are provided for the purpose of obtaining the best tuning for each channel by a fine and independent control of capacitance.

The four stators S (FIGS. 1 and 3) form four variable capacitors with the four rotors R. Each stator has a number of stator plates which is the same or one less than the number of the corresponding rotor plates, and they are rigidly mounted on a stator back plate 16.

The wedge shape of a stator plate is shown in FIG. 6, in which plate 15 so tapers from its base to its tip toward the shaft 10, as to have an included angle $\alpha$ to the shaft axis, equal to or slightly smaller than the angle $\beta$ of the rotor sectors P. Differently expressed, the working portion of the stator plate has a width no larger than that of the rotor sector being used. Furthermore, the stator plate faces and cooperates successively with only one sector of the rotor. It does not extend over or overlap two adjacent sectors at a time because the indexed rotation of the rotor is properly related to the sectors.

The shaft 10 is incrementally rotatable for thirteen positions, which cover twelve channels in the VHF band presently being used in the U.S.A., commonly called channels 2 through 13, and one idle position for the UHF band, which position corresponds to the No. 1 position, and the reception of which is handled by separate tuner circuitry not shown here. The capacitance is not needed for this No. 1 position.

For tuning the higher frequency VHF channels under optimum tuning condition, it is desirable to change the inductance, as by short-circuiting a part of the tuning coils which are used for the lower frequency VHF channels. Preferably the low potential part of the coil is short circuited.

The electrical diagram in FIG. 10 shows how the inductors are divided into two sections marked $L_h$ and $L_1$. For the higher frequency group of channels only the inductor $L_h$ is used, for which purpose the inductors $L_1$ are short circuited by the switches $SW_1$ through $SW_4$. For the group of lower frequency channels the switches are opened, thereby adding the inductors $L_h$ and $L_1$ in series to provide increased inductance value.

The transfer between short circuiting and open circuiting of said coils is actuated by rotation of the shaft 10 at two positions. One position is the boundary between channel No. 6 and channel No. 7. The other position may be either the boundary between channel No. 2 and the cut away section (the UHF position), or the boundary between channel No. 13 and the cut away section. Detailed mechanism to accomplish this will be described later.

Each capacitor has a cylindrical trimmer capacitor $C_{T1}$ through $C_{T4}$ shown in FIGS. 1, 3 and 10 corresponding to the variable capacitors $C_1$ through $C_4$ respectively. One of these trimmers is best shown in FIG. 2, referring to which each trimmer comprises a cylindrical dielectric 17 and a metallic adjusting rod 18 which is screwed into said cylindrical dielectric. Metallic cylindrical sleeves 19 and 20 are fitted around said cylindrical dielectric 17 at its ends.

The lower metallic sleeve 19 is soldered to the bottom plate 4 of the frame body in order to hold said dielectric upright on said bottom plate, with the dielectric passing through the bottom plate. The stator supporting plate or back plate 16 is soldered to the upper metallic sleeve 20. In this way each stator S is fixedly mounted on the bottom plate 4.

Screwing the adjusting rod 18 in or out varies the overlapping area or distance between the adjusting rod 18 and the upper metallic sleeve 20, for fine capacitance adjustment.

The detent action for indexing the rotor shaft is provided by a resilient detent 21 (FIG. 1) having a bent part 22, and a projection 23 at its free end. The bent part 22 is fixed on said bottom plate. The projection 23 presses yieldably against the teeth or scallops of the wheel or cam 11, to permit an incremental or indexed rotation of the shaft 10, for shifting from channel to channel.

As previously described, an important feature is the utilization of a switch SW which is closed to short circuit the coils $L_1$ for the higher frequencies when receiving channels Nos. 7–13, and which is opened to utilize the coils $L_1$ for the lower frequencies when receiving channels Nos. 2–6. This prevents excessive change in the quality factor Q. The action of said switch SW is effected between channels Nos. 6 and 7, and at either edge of the cut-away section 14.

A printed circuit board 24 (FIGS. 1, 2 and 3) forming the major electrical circuits is fixedly supported by the front and the back end plates 5 and 6, and faces a movable switch plate 26 made of insulating material and carrying a plurality (in this case four) movable contacts 25. As shown in FIG. 1, the movable plate 26 has a plurality of slots 27 in longitudinal direction, and receiving the reduced or necked upper ends 29 of supporting posts 28. Posts 28 are fixed in upright position on the printed circuit board 24. The plate 26 is slidable in the direction of the shaft 10, and one end of plate 26 projects through the front end plate 5 (FIGS. 1 and 3) of the frame. Snap washers 30 (FIGS. 2 and 3) fitted in grooves near the top of the posts 28 hold the plate 26 on the shouldered posts. Thus, the four movable contacts 25 perform the simultaneous switching of the four printed circuits on the printed board 24.

A seesaw type lever 31 is provided to move the plate 26, and includes pivoted ears 32 located at the center part of said lever and supporting said lever on bearings projecting from a plate secured to the front end plate 5. One end of arm 33 of the lever hooks the matingly notched end of said insulator plate 26 outside of the frame body, and the other arm 34 of the lever acts as a cam follower and has an ear 35 which is connected by a spring 36 to the front end plate 5. The spring urges follower arm 34 toward a face cam 37 which is rigidly mounted on the shaft 10 (FIGS. 1 and 3).

The working surface 39 of the cam 37 is about a half circle in length and has inclined ends 38 bent abruptly towards the front end plate 5 of the frame body. The follower end of the lever arm 34 may have a wheel as shown and follows the motion of said cam 37, whereby said arm 34 is pushed outward or away from the front end plate in order to shift the switch plate 26.

When the cam follower arm 34 leaves cam 37 it is pulled toward the front end plate 5 by the spring 36, until one end of the slots 27 of the switch plate 26 strike the supporting posts 28 to stop the motion, and plate 26 remains in that position. Thus the cam 37 causes the changing over of the switches $SW_1$ through $SW_4$.

An electrical connection diagram for a preferred embodiment of the invention is shown in FIG. 10. The system includes a radio frequency amplifier RF, a local oscillator circuit OSC, a mixer circuit M, and components such as vacuum tubes, transistors and diodes which are conveniently represented here as $Q_1$ for the amplifier RF, $Q_2$ for the mixer M, and $Q_3$ for the oscillator OSC. Because the diagram shows the reception of a low frequency band channel, the switches SW are shown open, so that the low frequency coils $L_1$ are in use. There are four tuning circuits, and the switches $SW_1$ through $SW_4$ are controlled in unison as aforementioned.

The radio frequency amplifier RF is of the input-output circuit tuning type, and a Colpitts' type circuit is used for the local oscillator. The antenna terminal is represented as "Ant." and the intermediate frequency transformer connection terminal is represented as I.

The construction described has many advantages. By a suitable selection of the components to be used in the circuits, the four variable condensers may be assembled with the same rotor plates and the same stator plates, thereby reducing cost by decreasing the number of different parts needed.

The factory assembly line may be divided into three major courses which comprise (a) assembling of the frame bodies, (b) fitting the electrical parts on the printed circuit board, and (c) assembling of the variable condensers. The processing in each course is simplified so that a mass-production system is available with extremely low cost.

A capacitance control system is adopted, using metallic sectors which are provided by dividing the rotary plate into respective elements for each channel, so that a fine tuning control is attainable independently, freely, and without inter-channel interference.

The tuning element for each channel may be produced at one time using the punching die of the rotor plate so as to meet the requirements of a mass-production process.

The detent cam for indexed rotation has only thirteen equinangularly divided positions, and is easy to manufacture. It easily provides accurate and positive incremental rotation.

The changeover switch is operated only between the group of higher frequency channels and the group of lower frequency channels and not at every channel change, so that troubles caused by improper contacting of switch contacts are mostly eliminated, in contrast with presently available tuners of the switch type and the turret type.

It is believed that the construction and operation of my improved tuner as well as the advantages thereof will be apparent from the foregoing detailed description. It will also be apparent that while I have shown and described the tuner in a preferred form, changes may be made without departing from the scope of the invention, as sought to be defined in the following claims.

I claim:

1. A variable capacitor for a television tuner, said capacitor comprising a shaft carrying rotor plates at least one of which is divided by radial slots into sectors of equal angle which correspond to television channels, said rotor plates being interleaved with stator plates which are generally wedge shaped and conform to one sector of the rotor, the working portions of said stator plates having an angle and width no larger than that of the rotor sectors, the radius of each rotor sector being such as to provide a desired capacitance for tuning its corresponding television channel, and detent means to so index the shaft as to register one or another of the rotor sectors with the stator for channel selection, in which the rotor is divided into n+1 sectors for the tuning of n television channels, and in which one like sector of all of the rotor plates is removed to provide an idle position of the capacitor.

2. A variable capacitor for a television tuner, as defined in claim 1, which is designed for use in the U.S.A., and in which the rotor plates are divided into thirteen sectors for the tuning of twelve VHF channels, and in which the idle sector may be turned to when using different circuitry for the reception of UHF channels.

3. A television tuner having a variable capacitor as defined in claim 2, and having fixed coils connected to said capacitor for tuning, there being one coil for the tuning of the group of higher frequency channels, an additional coil in series with the first coil for the tuning of the group of lower frequency channels, a switch for short circuiting the second coil when tuning the group of higher frequency channels, and means operated by the shaft of the variable capacitor to close the switch during the transition from the lower frequency channels to the higher frequency channels, and to open the switch during the transition from the higher frequency channels to the lower frequency channels.

4. A variable capacitor for a television tuner as defined in claim 2, comprising a relatively long rigid shaft carrying groups of rotor plates interleaved with groups of stator plates for ganged control in unison of a plurality of such capacitors, and in which the detent means to index the shaft comprises a detent wheel having a toothed periphery and secured to the shaft, and a detent pressed resiliently against the said toothed periphery.

5. A television tuner having a variable capacitor as defined in claim 4, and having fixed coils connected to said capacitors for tuning, there being one coil for the tuning of the group of higher frequency channels, an additional coil in series with the first coil for the tuning of the group of lower frequency channels, a switch for short circuiting the second coil when tuning the group of higher frequency channels, and means operated by the shaft of the variable capacitor to close the switch during the transition from the lower frequency channels to the higher frequency channels, and to open the switch during the transition from the higher frequency channels to the lower frequency channels, there being such coils and a switch for each of the ganged capacitors, and means whereby the switches are operated in unison.

6. A television tuner comprising a variable capacitor, said capacitor comprising a shaft carrying rotor plates at least one of which is divided by radial slots into sectors of equal angle which correspond to television channels, said rotor plates being interleaved with stator plates which are generally wedge shaped and conform to one sector of the rotor, the working portions of said stator plates having an angle and width no larger than that of the rotor sectors, the radius of each rotor sector being such as to provide a desired capacitance for tuning its corresponding television channel, and detent means to so index the shaft as to register one or another of the rotor sectors with the stator for channel selection, said tuner having fixed coils connected to said capacitor for tuning, there being one coil for the tuning of a group of higher frequency channels, an additional coil in series with the first coil for the tuning of a group of lower frequency channels, a switch for short circuiting the second coil when tuning the group of higher frequency channels, and means operated by the shaft of the variable capacitor to close the switch during the transition from the lower frequency channels to the higher frequency channels, and to open the switch during the transition from the higher frequency channels to the lower frequency channels.

7. A television tuner comprising a variable capacitor, said capacitor comprising a shaft carrying rotor plates at least one of which is divided by radial slots into sectors of equal angle which correspond to television channels, said rotor plates being interleaved with stator plates which are generally wedge shaped and conform to one sector of the rotor, the working portions of said stator plates having an angle and width no larger than that of the rotor sectors, the radius of each rotor sector being such as to provide a desired capacitance for tuning its corresponding television channel, and detent means to so index the shaft as to register one or another of the rotor sectors with the stator for channel selection, said capacitor further comprising a relatively long rigid shaft carrying groups of rotor plates interleaved with groups of stator plates for ganged control in unison of a plurality of such capacitors, and in which the detent means to index the shaft comprises a detent wheel having a toothed periphery and secured to the shaft, and a detent pressed resiliently against the said toothed periphery, said tuner having fixed coils connected to said capacitors for tuning, there being one coil for the tuning of a group of higher frequency channels, an additional coil in series with the first coil for the tuning of a group of lower frequency channels, a switch for short circuiting the second coil when tuning the group of higher frequency channels, and means operated by the shaft of the variable capacitor to close the switch during the transition from the lower frequency channels to the higher frequency channels, and to open the switch during the transition from the higher frequency channels to the lower frequency channels, there being such coils and a switch for each of the ganged capacitors, and means whereby the switches are operated in unison.

References Cited

UNITED STATES PATENTS

| | | | |
|---|---|---|---|
| Re. 20,632 | 1/1938 | Lewis | 334—55 X |
| 1,525,778 | 2/1925 | Hellmann | 317—253 |
| 1,988,444 | 1/1935 | Carpenter | 334—82 X |
| 2,123,050 | 7/1938 | Johnson | 317—253 |
| 2,491,480 | 12/1949 | McL. Davis et al. | 334—82 X |
| 2,773,988 | 12/1956 | Thias | 317—254 X |
| 2,864,946 | 12/1958 | Achenbach | 334—82 X |
| 3,201,714 | 8/1965 | Border et al. | |
| 3,292,060 | 12/1966 | Schatter et al. | 317—253 |

FOREIGN PATENTS

| | | |
|---|---|---|
| 1,198,873 | 8/1965 | Germany. |
| 419,282 | 3/1947 | Italy. |
| 77,061 | 4/1933 | Sweden. |
| 226,580 | 7/1943 | Switzerland. |

ELI LIEBERMAN, Primary Examiner

W. H. PUNTER, Assistant Examiner

U.S. Cl. X.R.

317—254; 334—55, 79, 82, 83